Dec. 24, 1935.   E. B. WILFORD   2,025,561
GYROPLANE
Original Filed Oct. 30, 1931
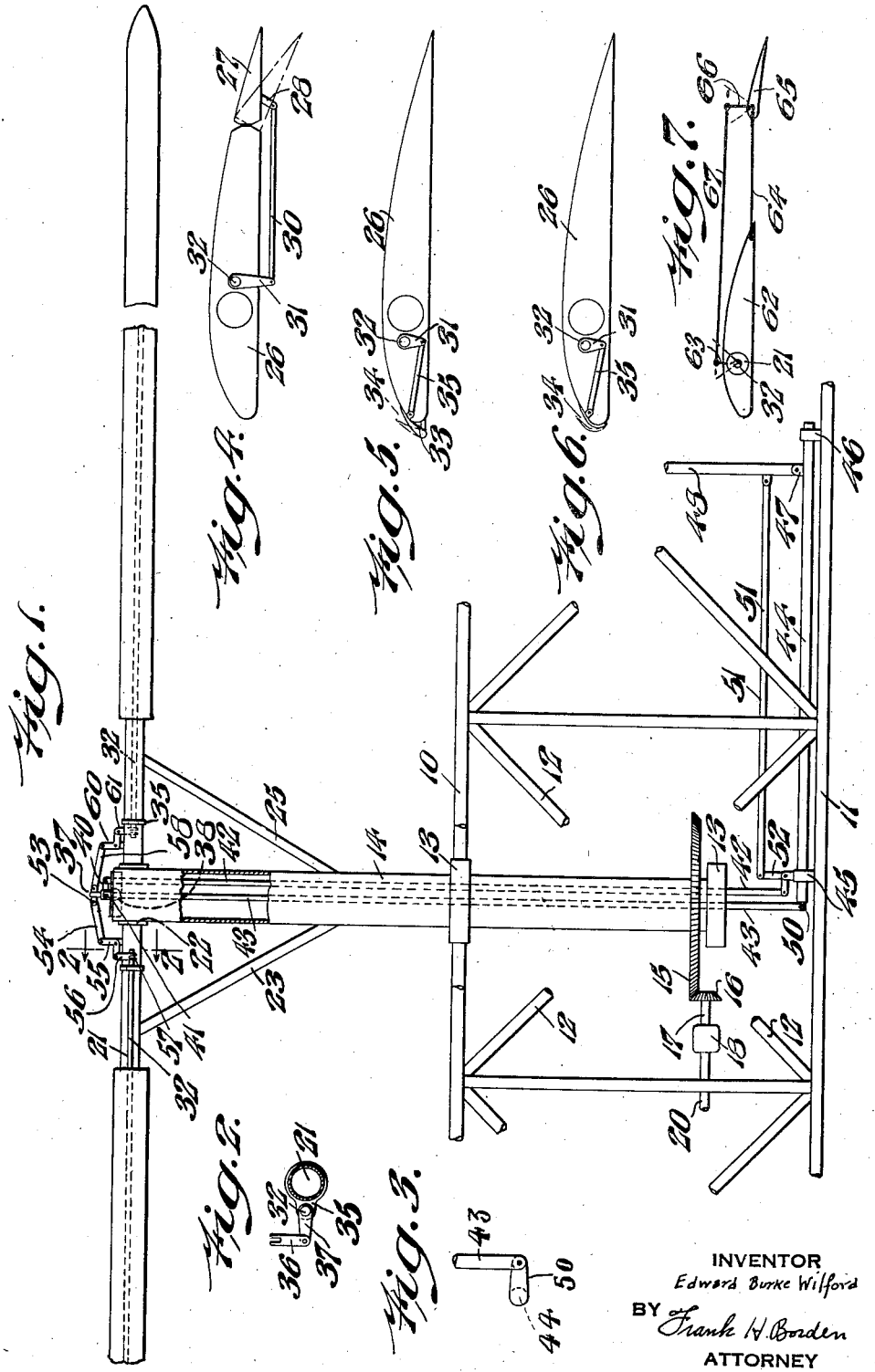
INVENTOR
Edward Burke Wilford
BY
Frank H. Borden
ATTORNEY Patented Dec. 24, 1935

2,025,561

UNITED STATES PATENT OFFICE 2,025,561

GYROPLANE

Edward Burke Wilford, Merion, Pa.

Application October 30, 1931, Serial No. 571,946
Renewed May 5, 1934

2 Claims. (Cl. 244—19)

This invention relates to gyroplanes.

In gyroplanes as heretofore constructed it has been necessary to provide for change of attitude of the blades of the rotating wing system in order to obviate the rolling moment occasioned by the differential lift of diametrically opposite blades. As is well known the differential lift is incident to the fact that on one side of the gyroplane the velocity of propulsion of the aircraft is added to the velocity of the wings or blades, while on the other side of the gyroplane it must be subtracted therefrom and the wings on the two sides are therefore operating under different conditions and have different effective lift components.

It is among the objects of this invention to provide a gyroplane with blades the attitude of which is predetermined and fixed but which incorporates means for obviating rolling moments; to provide a gyroplane with fixed blades in which rolling moments are obviated but in which rolling or pitching moments can be developed for control; to provide in a gyroplane means for selectively varying the lift of the blade; and many other objects and advantages as will become more apparent as the description proceeds.

In the accompanying drawing:

Fig. 1 represents a fragmentary side elevation partially in section of a gyroplane constructed according to this invention, Fig. 2 represents a transverse vertical section taken on line 2—2 thereof, Fig. 3 represents a fragmentary elevation of a portion of the control devices, Fig. 4 represents a diagrammatic end elevation of one form of blade or wing of the gyroplane, Fig. 5 represents a modified diagrammatic disclosure of a wing for the gyroplane, Fig. 6 represents a still further diagrammatic disclosure of a form of wing for the gyroplane, and Fig. 7 represents a still further diagrammatic disclosure of a gyroplane wing in which the blade is oscillatable on the fixed shaft to vary its effective lift.

Referring to Fig. 1, certain of the structural elements of a fuselage as disclosed such as upper longeron 10, lower longeron 11, and cross struts 12. Bearings 13 are provided to rotatably support the hollow mast 14, the substantially vertical axis of which forms the axis of rotation of the rotating wing system to be described. The hollow mast 14 may carry a ring gear 15 in mesh with a pinion gear 16 driven by shaft 17 through a clutch 18 of any desired sort connected with shaft 20 connected with a source of power (not shown).

Although it is preferred that the gyroplane utilize a plurality of blades, such as four for instance, preferably extending radially of the vertical axis of mast 14, yet for purposes of simplicity of disclosure a two bladed gyroplane has been disclosed. Thus a spar or shaft 21 is preferably rigidly connected as at 22 to the upper end of mast 14 and may be supported by bars 23 connected to mast 14. Preferably diametrically opposite to spar 21 is spar 24 extending radially of mast 14 and suitably reinforced by bars 25. The spars 21 and 24 carry the rigidly mounted airfoils 26. Airfoils 26 comprising the blades or wings of the gyroplane are each provided with means for varying the lift of the airfoil. Obviously the "lift varying" means may include a wide range of devices or combinations of devices but a few typical devices should suffice to illustrate the invention. Thus in Fig. 4 the airfoil 26 may support a more or less elongated aileron 27 having a horn 28 connected by link 30 to the lever 31 connected to the longitudinally extending rotatable control shaft 32. In Fig. 5 airfoil 26 housing the rotatable control shaft 32 may have a flap 33 to define a slot 34 and be actuated by link 35 driven by the lever 31. The disclosures of Figs. 4 and 5 represent lift increasing devices. However, it is contemplated that lift nullifying or decreasing devices may also be used such as may be typified by the disclosure of Fig. 6 in which the airfoil 26 is provided on the entering edge with a "spoiler" 34 pivoted at the entering edge of the airfoil and controlled by the link 35 actuated by the lever 31 connected to the rotatable control shaft 32.

For purposes of illustration it will be assumed that the blades 26 disclosed in Fig. 1 are provided with some such lift increasing or lift decreasing devices and that the rotatable control shaft 32, extending longitudinally of the blades or wings, preferably beside the spars 21 and 24, terminate rather close to the junction of the spars with the mast 14, and may be supported in bearings 35 carried by those spars. Obviously if it were deemed more desirable the rotatable control shafts might be disposed in concentric relation to the spars 21 and 24 either inside or outside of those spars although there is less weakening of the spar structure by disposing the control shafts as illustrated.

The upper end of the hollow mast 14 may carry a plug or block 36 having anti-friction relation to the interior of the hollow mast so that the mast may turn freely without turning the block or plug. A substantially vertical pin 37 is mounted for universal adjustment by the ball and socket 38 in the plug 36 and carries bell crank lever arms 40 and 41 horizontally disposed at 90° to each other and having each a flexible connection to the upper ends of control push rods 42 and 43 housed in the mast 14 and extending to any suitable manual control device that may be desired to actuate same. Such control mechanism may be of any desired sort and for illustrative purposes may comprise the longitudinal rod 44 journalled in bearings 45 and 46 carrying the lug 47 to which the control stick 48 is pivotally connected and at the other end including a lever arm 50 to which rod 43 is pivotally connected. The link 51 is pivotally connected to the control stick 48 at one end and at the other to a bell crank lever 52 to which pull rod 42 is pivotally connected.

It will be observed that movement of the stick 48 longitudinally of the gyroplane (in the plane of the paper) will cause pin 37 to be moved in the same plane about its pivot in the ball and socket connection 38 while lateral movement of stick 48 will actuate rod 43 to cause lateral movement of pin 37. Movement of the control stick 48 in two planes simultaneously will position pin 37 in both planes simultaneously. Any movement of pin 37 causes it to assume a position of eccentricity relative to the axis of rotation of the system. Pin 37 has pivotal connection with a link 54 connected to bell crank lever 55 in turn connected by link 56 to an arm 57 carried by the rotatable control shaft 32 associated with spar 21. Similarly a link 58 connected with bell crank 60 and through a link 61 to an arm carried by the rotatable control shaft 32 associated with spar 24.

It will be observed that any eccentricity of pin 37 relative to the mast 14 will cause simultaneous but opposite oscillations of the respective control shafts 32 during the rotation of the wing system. This movement of the control shafts will cause equal but opposite operation of the lift varying means associated with the blades or wings so as to obtain any desired equalization of lift so as to eliminate rolling moments or to secure any desired unequalization of lift so as to secure a desired rolling or pitching moment for the system. In this connection it will be understood that the normal position of stick 48 in a neutral substantially vertical position may be accompanied by such eccentricity of pin 37 as may be desired to eliminate residual rolling moments in the system by properly proportioning pull rods 42 and 43. Thereafter movements of pin 37 from its predetermined no-rolling-moment position will secure desired rolling or pitching moments such as to secure stabilizing functions from the gyroplane without recourse to ailerons, stub wings, and the like.

In the case of the use of airfoils having ailerons as shown in Fig. 4 it will be understood that the aileron 27 on one blade will be pulled downwardly to increase the lift of the airfoil with which it is associated, while the aileron on the opposite airfoil is elevated to decrease the effect of lift of the last mentioned airfoil. In the case of flaps and slots formed thereby as shown in Fig. 5, this may be operated by having each flap slightly open as a normal setting and have one open further while the other closes, or, and this is preferred, an elastic connection may be had between arm 31 and the link 35 so that with an initial closed position of the slot, lever arm 31 may move toward the rear of the airfoil through a lost motion connection with link 35, but may not move toward the entering edge without opening the slot. It will be obvious in this latter case that the increase of lift of an airfoil in the rotating wing system will not be accompanied necessarily by a decrease in the lift of the opposite blade in the system. Similarly the use of a "spoiler" flap of Fig. 6 is preferably operative on but one blade at a time with the action of the rotatable control shaft of the other blade nullified by a suitable lost motion connection. Obviously the "lost motion" connection may be provided at any suitable point, either as described or by means of a slot in each of arms 54 and 58, where they connect to the respective bell crank 55 and 60.

In the form of invention disclosed in Fig. 7 the blade 62 instead of being rigidly fixed to the shaft 21 is journalled thereon for free oscillation. In this case the control shaft 32 is disposed within the tubular shaft 21 and carries an upstanding horn 63 arranged for movement relative to the shaft 21 and to the blade 62. Trailing edge supporting strips 64 extend rearwardly of the blade 62, the outer ends of which pivotally support the control surface 65. The control surface has the upstanding horn 66 connected by the link 67 to the horn 63. It will be understood that oscillation of the control shaft 32 moves horn 63, and, through link 67 causes a change in the attitude or angle of incidence of the control surface 65. Variations in the angle of incidence of the latter will change its effective lift so that it will exert a variable torque on blade 62 relative to its axis on shaft 21 causing blade 62 to change its effective angle of incidence and therefore its effective lift during the rotation of the wing system.

I claim:

1. In aircraft, an aerodynamically rotating wing system including a blade, means mounted on the blade and operable to define a slot adjacent the entering edge of said blade, means operable to vary the condition of the slot to establish substantially similar aerodynamic reactions of the blade in all positions of rotation of the system.

2. In aircraft, an aerodynamically rotating wing system including a blade, means operable to define a slot adjacent the entering edge of said blade, means operable to vary the condition of the slot to establish substantially similar aerodynamic reactions of the blade in all positions of rotation of the system, said means selectively operable to vary the condition of the slot to secure a desired unequal aerodynamic action of said blade at different positions of rotation of the system.

EDWARD BURKE WILFORD.